United States Patent
Kwahk et al.

(10) Patent No.: US 7,062,668 B2
(45) Date of Patent: Jun. 13, 2006

(54) METHOD AND SYSTEM FOR INFORMATION HANDLING SYSTEM COMPONENT POWER MANAGEMENT SEQUENCING

(75) Inventors: Jonathan A. Kwahk, Cedar Park, TX (US); Marc D. Alexander, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 467 days.

(21) Appl. No.: 10/422,247

(22) Filed: Apr. 24, 2003

(65) Prior Publication Data

US 2004/0215983 A1 Oct. 28, 2004

(51) Int. Cl.
*G06F 1/32* (2006.01)

(52) U.S. Cl. ............... 713/330; 713/320; 713/323; 713/330

(58) Field of Classification Search ............... 713/300, 713/320, 324, 330, 323
See application file for complete search history.

(56) References Cited

U.S. PATENT DOCUMENTS

| | | | |
|---|---|---|---|
| 5,848,282 A * | 12/1998 | Kang | 713/323 |
| 5,960,207 A | 9/1999 | Brown | 395/750.01 |
| 6,348,035 B1 * | 2/2002 | Takami | 600/132 |
| 6,510,525 B1 | 1/2003 | Nookala et al. | 713/324 |
| 6,513,114 B1 | 1/2003 | Wu et al. | 713/2 |
| 6,532,506 B1 * | 3/2003 | Dunstan et al. | 710/100 |
| 6,868,501 B1 * | 3/2005 | Saitou et al. | 713/330 |
| 6,907,227 B1 * | 6/2005 | Fujioka | 455/41.3 |
| 2004/0068672 A1 * | 4/2004 | Fisk et al. | 713/323 |

* cited by examiner

*Primary Examiner*—Thomas Lee
*Assistant Examiner*—Malcolm Cribbs
(74) *Attorney, Agent, or Firm*—Hamilton & Terrile, LLP; Robert W. Holland

(57) ABSTRACT

A power consumption manager and a power manager sequencer coordinate transition of information handling system components between active and inactive states to manage information handling system power consumption. The power manager transitions components to an inactive state upon a determination of inactivity and then shuts down, for instance by operating as a module in the BIOS. Activation of an I/O device, such as the power switch, restores the power manager to an active state to allow recovery of the information handling system to an operational status. The power manager sequencer detects activation of the I/O device to restore selected components to an active state substantially simultaneous with the power manager so that the selected components have power to accept recovery instructions from the power manager. For instance, a network interface controller receives power to recover from an inactive state before the BIOS sends a PCI bus reset command.

18 Claims, 2 Drawing Sheets

METHOD AND SYSTEM FOR INFORMATION HANDLING SYSTEM COMPONENT POWER MANAGEMENT SEQUENCING

BACKGROUND OF THE INVENTION

1. Field of the Invention

The present invention relates in general to the field of information handling system power management, and more particularly to a method and system for information handling system component power management sequencing.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the number of information handling systems in use by individuals, businesses and governments have increased, power consumption by information handling systems has also increased. Often, information handling systems are left on in a fully operational state even though their users are not actively performing functions or otherwise using the information handling systems. For instance, users frequently leave information handling systems on when the users are absent, such as during lunch or other breaks or even at the end of the business day. To reduce wasted power consumption that results from running information handling systems when those systems are not being actively used, government has encouraged the adoption of a number of power management standards that automatically bring information handling systems to reduced power states during periods of non-use. For instance, information handling system components are shut down after a period of time in which no user inputs are detected and automatically returned to an operational state when a user makes an input or activates the power button.

The power consumption standards demanded by government specify an amount of allowable power consumption in a power down state that is very small. However, as information handling system components have grown more powerful these components tend to consume greater amounts of power so greater numbers of components generally must be powered down in order to meet the power consumption standards. Typically, power management is accomplished by firmware located in the BIOS that selects components to power down so that power consumption in a power down inactive state (S5) is less than one watt, substantially less than power consumption in the active state (S0). The power management firmware in the BIOS also typically handles power up from the inactive state to the active state, such as when a user initiates use of the information handling system. In very low power consumption states, the BIOS itself is typically powered down so that power up generally occurs when the user activates the power switch to apply power to the BIOS and power management firmware. One difficulty with performing power management from the BIOS is that some components should have power before or simultaneously with the BIOS. For instance, network interface controllers (NICs) generally should have power before the BIOS performs a PCI reset during recovery from the power save mode. Thus, information handling systems that have NICs which consume greater than an allowable power consumption of an inactive state will fail to meet the power consumption standard where power management is performed by BIOS firmware.

SUMMARY OF THE INVENTION

Therefore a need has arisen for a method and system which sequences information handling system component recovery from a power management inactive state.

A further need exists for a method and system which supports power management of information handling system NIC components to and from an inactive state.

In accordance with the present invention, a method and system are provided which substantially reduce the disadvantages and problems associated with previous methods and systems for managing information handling system component transitions between active and inactive states for power consumption management. A power management sequencer commands restoration of power to selected components so that the selected components have power for accepting instructions to recover from an inactive state.

More specifically, a power management module supported in an information handling system BIOS transitions components of the information handling system from an active to an inactive state after a time period of user inactivity at the information handling system, including the BIOS itself. Upon detection of activation of an I/O device, such as the power switch of the information handling system, the BIOS recovers to an active state and the power management module transitions inactivated components to an active state. Activation of the I/O device is also detected by a power management sequencer which coordinates the application of power to selected components substantially simultaneous with application of power to the BIOS so that the selected components are powered to accept commands communicated from the power management module. For instance, a NIC transitioned to an inactive state by the power management module receives power based on an override command from the power management sequencer when the power switch is activated so that the NIC is powered up to receive a PCI bus reset command from the BIOS when the power management module transitions information handling system components to an active state from an inactive state.

The present invention provides a number of important technical advantages. One example of an important technical advantage is the power management sequencer sequences selected information handling system components to receive power independent from control of the power management module. Thus, inactive components that would otherwise lack power are able to receive commands from the power management module to aid in recovery from a power management inactive state. This allows inactive power states to include the powering down of a greater number of information handling system components to reduce power consumption yet successfully recover to an active state.

Another example of an important technical advantage of the present invention is that the power management sequencer supports power management of information handling system NIC components to and from an inactive state by ensuring that a NIC has power to receive a bus reset before the power management module would otherwise be able to provide power to the NIC. Thus, the power management module achieves an inactive power state with reduced power consumption by powering down the NIC with the power management sequencer providing power to the NIC to support recovery of the NIC to an active state by allowing the NIC to receive a bus reset from the power management module before the power management module would otherwise be able to command power to the NIC.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An inactive state of an information handling system reduces power consumption by powering down components that recover to an active state out of a sequence manageable by a power manager. A power management sequencer coordinates application of power to selected components before the components receive commands from the power manager to recover the information handling system to an operational state. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
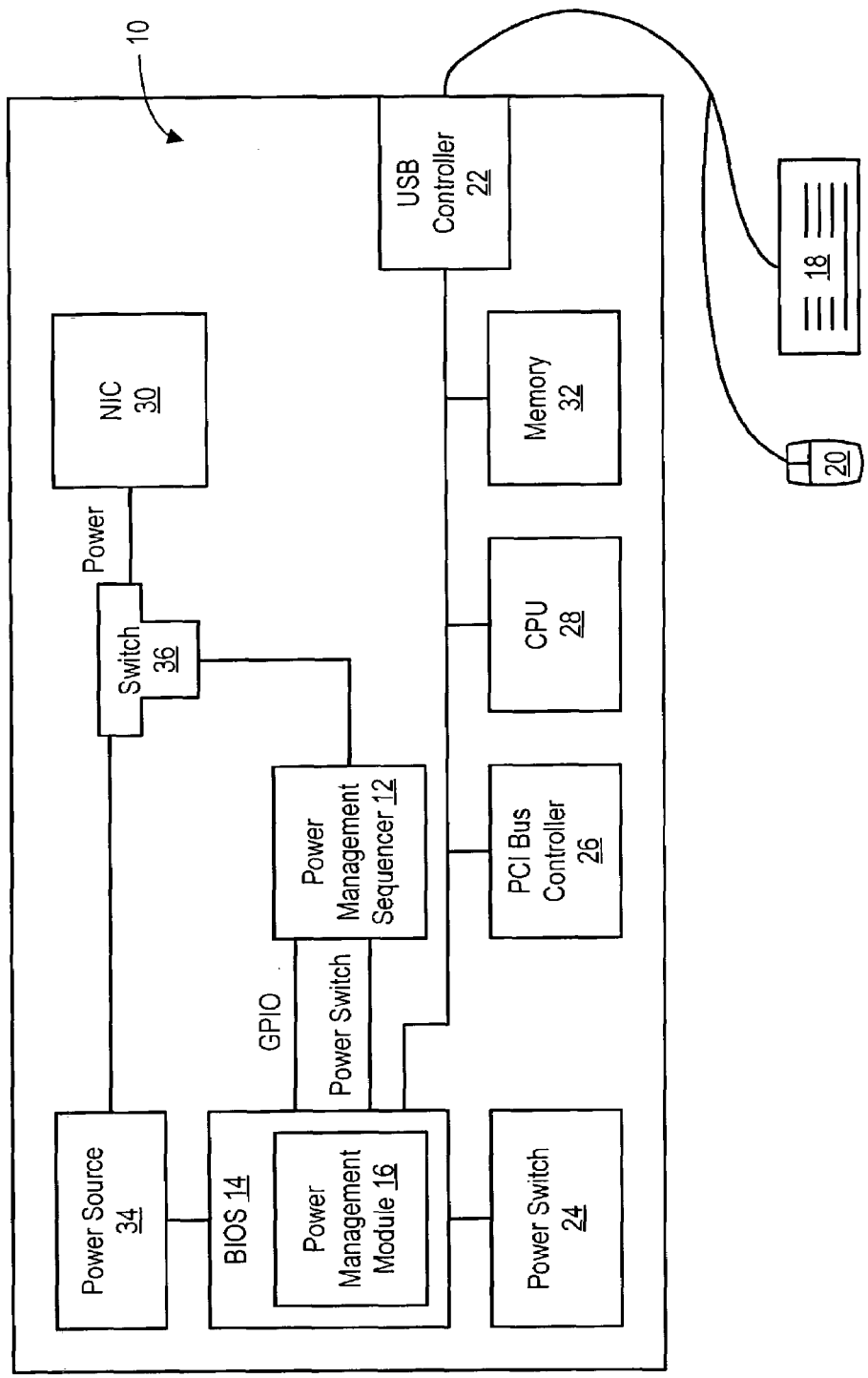
FIG. 1 depicts a block diagram of an information handling system configured to manage power consumption with a sequencer to control recovery of components to an active state.

Referring now to FIG. 1, a block diagram depicts an information handling system 10 configured to manage power consumption with a power management sequencer 12 that controls recovery of components from an inactive state to an active state. A BIOS 14 incorporates a power management module 16 that detects inactivity by a user of information handling system 10 and manages transition of information handling system components to an inactive state for reducing power consumption. For instance, power management module 16 monitors I/O devices for indications of user activity, such as inputs from a keyboard 18 or mouse 20 through a USB controller 22 or activation of a power switch 24. If no user activity is detected for a predetermined time period, power management module 16 transitions enough information handling system components to a inactive state that power consumption falls below a desired level, such as by communicating through general purpose input/output commands (GPIO). For instance, in a minimal power consumption state, power management module 16 may transition BIOS 14, PCI bus controller 26, CPU 28 and NIC 30 to inactive states while leaving memory 32 and USB controller 22 active to save data from existing operations and detect inputs by a user to information handling system 10.

In a low power consumption state with BIOS 14 powered down, recovery to an active state generally requires activation of power switch 24 to apply power from power source 34 to BIOS 14 before firmware of power management module 16 operates to transition components from an inactive to an active state, such as by issuance of GPIO commands. However, power up of BIOS 14 involves a power up sequence, such as sending a PCI bus reset and performing opcode fetches, before BIOS 14 is able to flip GPIO commands to enable application of power to components. In some cases, components use information communicated from BIOS 14 as part of the power up sequence before BIOS 14 is able to apply power to the components. In such instances, these components will not recover properly from an inactive state unless power is applied to the component before BIOS 14 communicates the information. As a specific example, NIC 30 should have power before BIOS 14 sends a PCI reset, however, the PCI reset issues before in normal power up sequence before BIOS 14 is able to command power to NIC 30.

Power management sequencer 12 supports recovery of selected information handling system components from an inactive to an active state by applying power to the selected components before information is communicated to the selected components by power management module 16 through BIOS 14. Power management sequencer 12 and power source 34 input to a power switch 36 that activates power to NIC 30 in the system inactive state. Under normal operations, BIOS 14 controls the output from power management sequencer 12 with GPIO commands. However, in an inactive state, power management sequencer 12 receives an input generated by activation of power switch 24 that overrides the GPIO state and commands power through switch 36 to NIC 30. Thus, a user activation of power switch 24 to recover an information handling system from a power-saving inactive state results in power application to BIOS 14 substantially simultaneous with power application to NIC 30 so that NIC 30 has power to receive information communicated by BIOS 14, such as a PCI reset, even before BIOS 14 is able to command power with GPIO commands under the normal sequence of events. Similarly, other components may receive power out of sequence by interfacing with power management sequencer 12.

Figure 2:
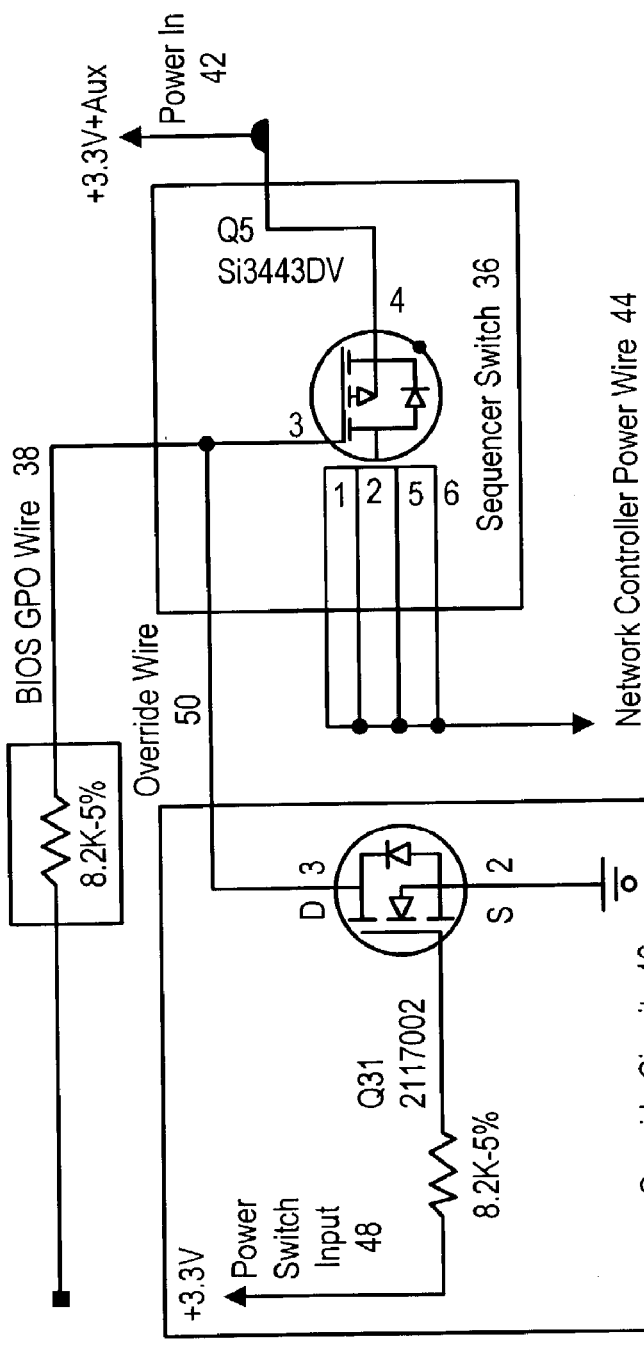
FIG. 2 depicts a power management sequencer to manage out of sequence power application to selected information handling system components.

Referring now to FIG. 2, one embodiment of power management sequencer 12 is depicted. During normal operations, a BIOS GPO wire 38 commands sequencer switch 36 to communicate a power command to a NIC or other component if power is present at power in wire 42 and main power is not present, such as in the inactive state. For instance, if power in 42 wire has power and BIOS GPO wire is low, a power on command is communicated through network controller power wire 44, and if BIOS GPO wire is high, a power off command is communicated. However, the output of network controller power wire 44 is selectively overridden by an override circuit 46 based on the input from power switch input wire 48. If the information handling system power switch is activated to recover from a power down state, override wire 50 provides a low signal that commands power to the NIC regardless of the output from the BIOS GPO. Override circuit 46 thus overrides BIOS power management commands to apply power to the NIC or other selected components substantially simultaneous with activation of the power switch. By providing power out of sequence, the NIC or other selected components have power to receive communications in support of transition to an active state.

Although the present invention has been described in detail, it should be understood that various changes, substitutions and alterations can be made hereto without departing from the spirit and scope of the invention as defined by the appended claims.

What is claimed is:

1. An information handling system comprising:
  plural information processing components operational to process information;
  a power management module operational to selectively power down and recover one or more information processing components to manage power consumption;
  a power management sequencer interfaced with the power management module and one or more of the information processing components, the power management sequencer having a switch operational to apply power to initiate power up of the one or more information processing components before communication of predetermined information from the power management module to the one or more information processing components; and
  wherein the power management module recovers the one or more information processing components from a power down state upon detection of a user input, and wherein the power management sequencer switch supplies power to the one or more information processing components upon detection of the user input.

2. The information handling system of claim 1 wherein the power management module comprises the BIOS.

3. The information handling system of claim 1 wherein the one or more information processing components having power initiated by the power management sequencer comprises a network interface controller.

4. The information handling system of claim 3 wherein the power management sequencer is further operational to initiate power to the network interface controller before communication of a PCI reset command to recover from a power down state.

5. The information handling system of claim 1 wherein the user input comprises activation of a power switch.

6. The information handling system of claim 5 wherein the power management sequencer comprises a transistor interfaced with the one or more information processing components and operational to gate power to the information processing component upon activation of the power switch.

7. A method for sequencing power to information handling system components during power management, the method comprising:
  transitioning the information handling system components to an inactive state with a power management module;
  transitioning the power management module to an inactive state;
  detecting a power switch input to recover to an active state;
  transitioning the power management module to an active state based on the detected input;
  transitioning selected information handling system components to an active state based on the detected input; and
  transitioning remaining inactive information handling system components to an active state with the power management module.

8. The method of claim 7 further comprising sending predetermined information to the selected information handling system components from the power management module after the selected information handling system components are in an active state.

9. The method of claim 8 wherein the predetermined information comprises a bus reset command.

10. The method of claim 9 the selected information handling system components comprise a network interface controller.

11. The method of claim 8 wherein the power management module comprises the BIOS.

12. A system for sequencing power to a first set of components and a second set of components of an information handling system for management of power consumption, the system comprising:
  a power management module operable to transition the first set of components between active and inactive states and to transition the second set of components from an active to an inactive state;
  a power activation selector interfaced with the power management module to detect a request for activation of the components to an active state and to communicate the request for activation to the power management module for transition to an active state of the first set of component;
  a power management sequencer interfaced with the power activation selector and the second set of components, the power management sequencer operable to transition the second set of components to an active state in response to the request for activation so that the second set of components have power to communicate with the power management module.

13. The system of claim 12 wherein the power management sequencer comprises:
  an override circuit interfaced with the power activation selector, the override circuit operable to detect a request for activation of the components and output an override signal: and
  a power switch interfaced with the power management module, the override circuit and predetermined components, the power switch operable to provide power to the predetermined components if the power management module commands application of power or the override signal is detected.

14. The system of claim 13 wherein the power management module comprises firmware disposed in an information handling system BIOS that commands application of power with a GPIO command.

15. The system of claim 14 wherein the power activation selector comprises an information handling system power switch.

16. A method for information handling system power consumption management, the method comprising:
   determining inactivity at an information handling system for a predetermined time;
   powering down components of the information handling system to an inactive state with a power consumption manager to reduce power consumption by the information handling system;
   powering down the power consumption manager;
   detecting activity at the information handling system;
   powering up the power consumption manager and selected components in a substantially simultaneous manner; and
   managing recovery of the components with the power consumption manager.

17. The method of claim 16 wherein detecting activity further comprises detecting user activation of an I/O device and powering up the power consumption manager and selected components further comprises switching power on to the information handling system BIOS and network interface controller upon activation of the I/O device.

18. The method of claim 17 wherein the I/O device comprises the information handling system power switch.

* * * * *